Dec. 27, 1932.  J. S. PECKER  1,892,003
AIRCRAFT HAVING SUSTAINING ROTORS
Filed July 31, 1931
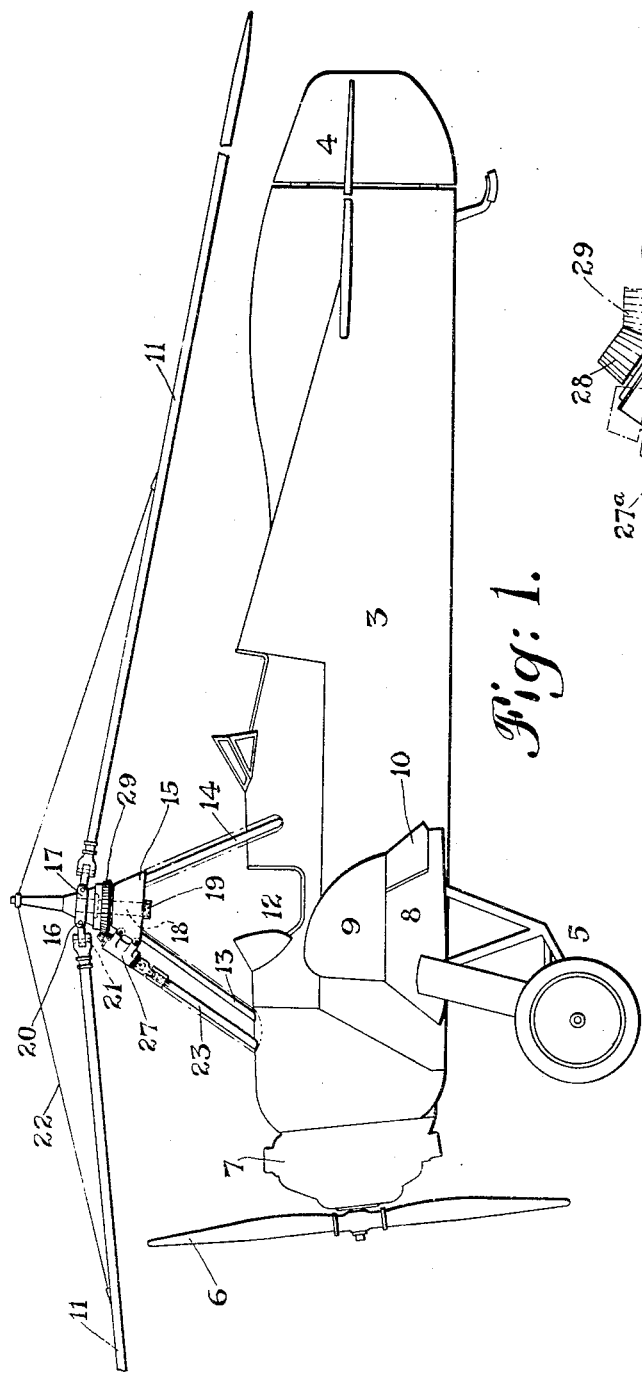
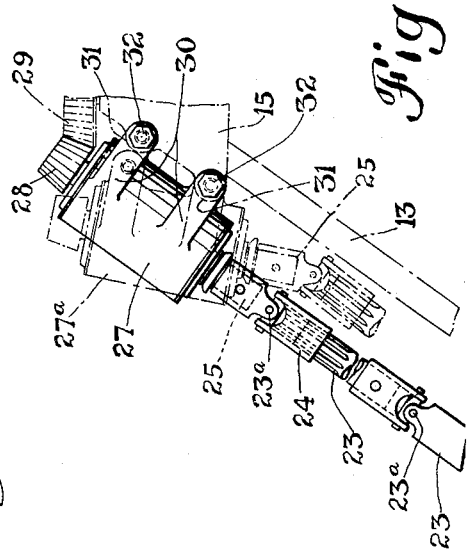
INVENTOR.
Joseph S. Pecker
BY
Synnestvedt & Lechner
ATTORNEYS.

Patented Dec. 27, 1932

1,892,003

UNITED STATES PATENT OFFICE

JOSEPH S. PECKER, OF PHILADELPHIA, PENNSYLVANIA, ASSIGNOR TO AUTOGIRO COMPANY OF AMERICA, OF PHILADELPHIA, PENNSYLVANIA, A CORPORATION OF DELAWARE

AIRCRAFT HAVING SUSTAINING ROTORS

Application filed July 31, 1931. Serial No. 554,268.

This invention relates to aircraft having sustaining rotors and is especially concerned with a mounting structure and driving means for such sustaining rotors.

One of the primary objects of the invention is involved in the provision of a cooperative assembly of mounting and driving parts, these parts being arranged so that convenient removal of the rotor as a whole may readily be effected, and also so that upon replacement of the rotor unit the driving parts which are associated therewith will always be returned to their proper relative positions.

More specifically, this invention has in view mounting a portion of a rotor driving system, preferably a gear, in a pivoted bracket or bearing housing, the pivotal movement of the gear provided in this way serving to permit displacement thereof away from a cooperating gear associated with the rotor hub. Upon separation of the gears in this manner the entire rotor unit may be dismounted or lifted from its supporting structure.

As an additional object the invention has in view simplification of driving and mounting parts, as well as provision for maximum convenience in assembly and disassembly.

The general nature of the invention, as well as objects and advantages in addition to those brought out above, will be more apparent from a consideration of the following description, making reference to the accompanying drawing, in which—

Fig. 1 is a somewhat diagrammatic side elevational view of an aircraft embodying various improvements of this invention, and Fig. 2 is an enlarged somewhat detailed view of portions of the rotor driving mechanism, especially the displaceable gear thereof.

The aircraft illustrated in Fig. 1 includes a body or fuselage 3 having an empennage 4, landing gear 5, and forward propulsion means including a propeller 6 and an engine 7, the latter being only diagrammatically indicated. In addition the craft is preferably provided with fixed supplemental lifting surfaces 8 having upturned tips 9, the surfaces 8 serving to support aileron controls 10.

The sustaining rotor itself is preferably composed of a plurality of blades 11 which are mounted above the craft, in this instance above a cockpit 12, by means of a plurality of leg or post elements 13 and 14. The leg elements, any convenient number of which may be employed, converge upwardly to be interbraced and secured in an apex structure 15 which serves directly to support the rotor hub indicated generally at 16.

The hub member 17 is mounted for free rotation about the central axis or spindle 18, the latter being secured to the apex structure 15 by means of a nut 19 which, in flight, serves to transmit thrust of sustention to the body of the craft. In order that the blades may be free individually to assume various positions of equilibrium between inertia, lift and other flight forces, they are preferably pivoted or articulated to the common hub member 17 by means of horizontally disposed, as well as vertically disposed, pivot pins 20 and 21 respectively. Cables or wires 22 may be employed for supporting the blades when they are inactive.

The rotor driving mechanism, which is particularly advantageous in initiating rotation of the blades prior to take-off from the ground, may suitably derive its energy or power from the engine 7, for example, in the manner described and claimed in my copending application Serial No. 512,383, filed January 30, 1931.

In accordance with this invention, a shaft 23 serves to transmit the torque derived from the engine upwardly toward the rotor hub, and as will be seen most clearly in Fig. 2, the upper end of this shaft is provided with a slip joint including a sleeve part 24, which serves to connect the shaft 23 with the end of an additional shaft 25. A pair of spaced universal joints 23a may also be provided in the shaft 23, these joints serving to permit certain relative movement between the rotor supporting structure and the body of the craft, without disturbing the driving connection, in the manner brought out in my copending application above identified. Such joints further perform an additional function in combination with other parts disclosed herein as will be more apparent herebelow. Both of the joints 23a are illustrated in Fig. 2 but in the preferred arrangement the lower one is mounted within the body or fuselage covering.

The shaft 25, furthermore, is journaled within a housing or bearing structure 27, at the upper side of which this shaft extends to support and drive a pinion 28. By comparison of Figs. 1 and 2 it will be seen that the pinion 28 cooperates with a gear 29 which is secured to the rotor hub, so that upon transmission of torque through the parts 23, 24, 25, 28 and 29, rotation of the hub 17 and the blades carried thereby is effected. The casing 27 may further house an over-running clutch, in accordance with my aforementioned copending application.

In accordance with this invention the bearing structure 27 is supported or mounted on the apex structure 15 by means of cooperating apertured lugs 30—30, and 31—31, formed on the bearing housing 27 and the structure 15, respectively. Removable pins or bolts 32 are extended through the cooperating pairs of lugs so that the upper driving unit is rigidly and accurately positioned with respect to the driven gear 29.

With an arrangement of the character described above, when it is desired to remove the rotor head for purposes of inspection, lubrication, repair, or the like, the nut 19 which normally serves for the transmission of the thrust or sustention to the body of the craft, is removed. In addition the upper one of the two attaching pins 32 for the bearing housing 27 is also displaced so that this bearing housing may be swung outwardly about the lower pin 32 to a position, for example, as indicated in dot and dash lines in Fig. 2 at 27a. The flexible joints 23a flex at this time to permit pivoting of the housing 27. This pivotal movement of the upper driving unit, as will be apparent from inspection of Fig. 2, displaces the pinion 28 from the gear 29 sufficiently to permit upward removal of the rotor.

The mounting of the rotor is preferably such as to permit removal thereof as a unit after unscrewing the single attaching nut 19. It should be understood, however, that a structure providing for this unitary removal is not a part of the present invention per se, but is described and claimed in the copending application of Agnew E. Larsen, Serial No. 529,576, filed April 13th, 1931, assignor to the assignee of this application.

However, a rotor structure which is arranged for unitary removal is especially advantageous when the driving mechanism is arranged in accordance with this invention, since the total number of steps or manipulations required in rotor removal is thereby reduced to a minimum. Note that it is necessary only to remove one of the pins 32 in order to displace the driving pinion 28 sufficiently to permit rotor removal.

It is also to be observed in this connection that the arrangement shown is highly advantageous when the rotor is replaced after lubrication or the like, since upon repositioning of the housing 27 and pinion 28 no shimming or the like need be adjusted. The pinion 28, therefore, is always returned accurately to the proper position for efficient and non-binding cooperation with the gear 29.

In addition, by the mere removal of both bolts 32, the entire upper driving unit 27, including the over-running clutch, if employed therein, may be lifted off for inspection or repair.

What I claim is:—

1. In an aircraft, a sustaining rotor, a mounting structure providing for removal of the rotor, and driving means for the rotor including a driven part and a cooperating driving part, the normal relative disposition of said parts being such as to interfere with removal of the rotor, together with means providing for relative displacement of said parts to facilitate rotor removal, the last mentioned means including a pivotal mounting for one of said parts.

2. In an aircraft, a sustaining rotor, a mounting structure providing for removal of the rotor, and driving means for the rotor including a driven part and a cooperating driving part, the normal relative disposition of said parts being such as to interfere with removal of the rotor, together with means providing for relative displacement of said parts without dismounting thereof to facilitate rotor removal.

3. For an aircraft, the combination of a sustaining rotor, a rotor mount, rotor drive mechanism including an upper driving unit operatively associated with the rotor, and a mounting for said unit on said mount including a pair of removable pin members, all so relatively arranged that by removal of one of said members said unit may be pivotally swung away from the rotor, and by removal of both said members said unit may be bodily dismounted.

4. In an aircraft having a sustaining rotor, a structure for mounting the rotor above the body of the craft, and driving means for the rotor including a gear associated therewith, a shaft with another gear thereon adapted to cooperate with the gear first mentioned, and mounting means for said shaft providing for swinging movement thereof to effect engagement and disengagement of the gears.

5. In an aircraft having a sustaining rotor, a structure for mounting the rotor above the body of the craft, and driving means for the rotor including a gear associated therewith, a shaft with another gear thereon adapted to cooperate with the gear first mentioned, and mounting means for said shaft providing for swinging movement thereof to effect engagement and disengagement of the gears, said mounting means being pivoted to said mounting structure.

6. In an aircraft having a sustaining rotor, a structure for mounting the rotor above the body of the craft, and driving means for the rotor including a gear associated therewith, a shaft with another gear thereon adapted to cooperate with the gear first mentioned, and mounting means for said shaft providing for swinging movement thereof to effect engagement and disengagement of the gears, together with means for locking the parts with the gears in engaged position.

7. In an aircraft having a sustaining rotor, a structure for mounting the rotor above the body of the craft, and a mechanism for driving the rotor including a gear connected with the rotor, an upper driving unit having a gear adapted to cooperate with the gear first mentioned, a slip joint and transversely jointed drive shaft extended downwardly toward the body of the craft from said unit, means for mounting said unit on said structure for pivotal movement on an axis offset from and extended substantially at right angles to the axis of said shaft, whereby to provide for engagement and disengagement of said gears, and releasable means associated with said unit and said structure for maintaining the gears in accurate alignment when meshed.

In testimony whereof I have hereunto signed my name.

JOSEPH S. PECKER.